United States Patent [19]

Antonaccio et al.

[11] 4,223,380
[45] Sep. 16, 1980

[54] DISTRIBUTED MULTIPROCESSOR COMMUNICATION SYSTEM

[75] Inventors: Joseph C. Antonaccio, Hazlet, N.J.; Bernard J. Verreau, Milford, Del.

[73] Assignee: NCR Corporation, Dayton, Ohio

[21] Appl. No.: 893,856

[22] Filed: Apr. 6, 1978

[51] Int. Cl.$^3$ .......................... G06F 15/16; H04J 3/00
[52] U.S. Cl. .................................................. 364/200
[58] Field of Search ... 364/200 MS File, 900 MS File; 179/15 AL

[56] References Cited
U.S. PATENT DOCUMENTS

| | | | |
|---|---|---|---|
| 3,400,372 | 9/1968 | Beausoleil | 364/200 |
| 3,470,542 | 9/1969 | Trantanella | 364/200 |
| 3,480,914 | 11/1969 | Schlaeppi | 364/200 |
| 3,483,520 | 12/1969 | Broderick et al. | 364/200 |
| 3,753,234 | 8/1973 | Gilbert et al. | 364/200 |
| 3,755,789 | 8/1973 | Collins | 364/200 |
| 3,787,627 | 1/1974 | Abramson et al. | 179/15 AL X |
| 3,820,079 | 6/1974 | Bergh et al. | 364/200 |
| 3,863,220 | 1/1975 | Osawa et al. | 179/15 AL X |
| 3,870,825 | 3/1975 | Roberts et al. | 179/15 AL |
| 4,099,233 | 7/1978 | Barbagelata et al. | 364/200 |

Primary Examiner—Gareth D. Shaw
Assistant Examiner—Thomas M. Heckler
Attorney, Agent, or Firm—J. T. Cavender; Wilbert Hawk, Jr.; Richard W. Lavin

[57] ABSTRACT

A distributed multiprocessor communication system, wherein the central processing unit (CPU) is relieved of the burden of bus management by a scheme which multiplexes the interprocessor module communications bus, to which all processors are guaranteed access, so that only an addressed CPU may be interrupted from performing its dedicated data processing function. Associated with each independent processor is a communications interface unit or communications network routing unit which relieves the processor of the task of decoding communications on the interprocessor or intermodule communications bus and, in addition, upon decoding its address and buffering message data, transmits a "handshake" signal over the bus back to the sender during a designated time slot, thereby informing the sender that the transmitted message was actually received. Moreover, if one module is in a high priority mode of communication with another module, all lower priority messages are prevented from entering that particular module; yet, any other pairs of modules may still communicate. In other words, no module can possibly tie up the bus, preventing other modules from communicating.

Once the data is placed onto the bus, under CPU direction, the transmission, reception, priority discrimination, and handshake are completely independent on CPU operation so that the time required to transfer a byte of data is independent of any processor in the system.

22 Claims, 6 Drawing Figures

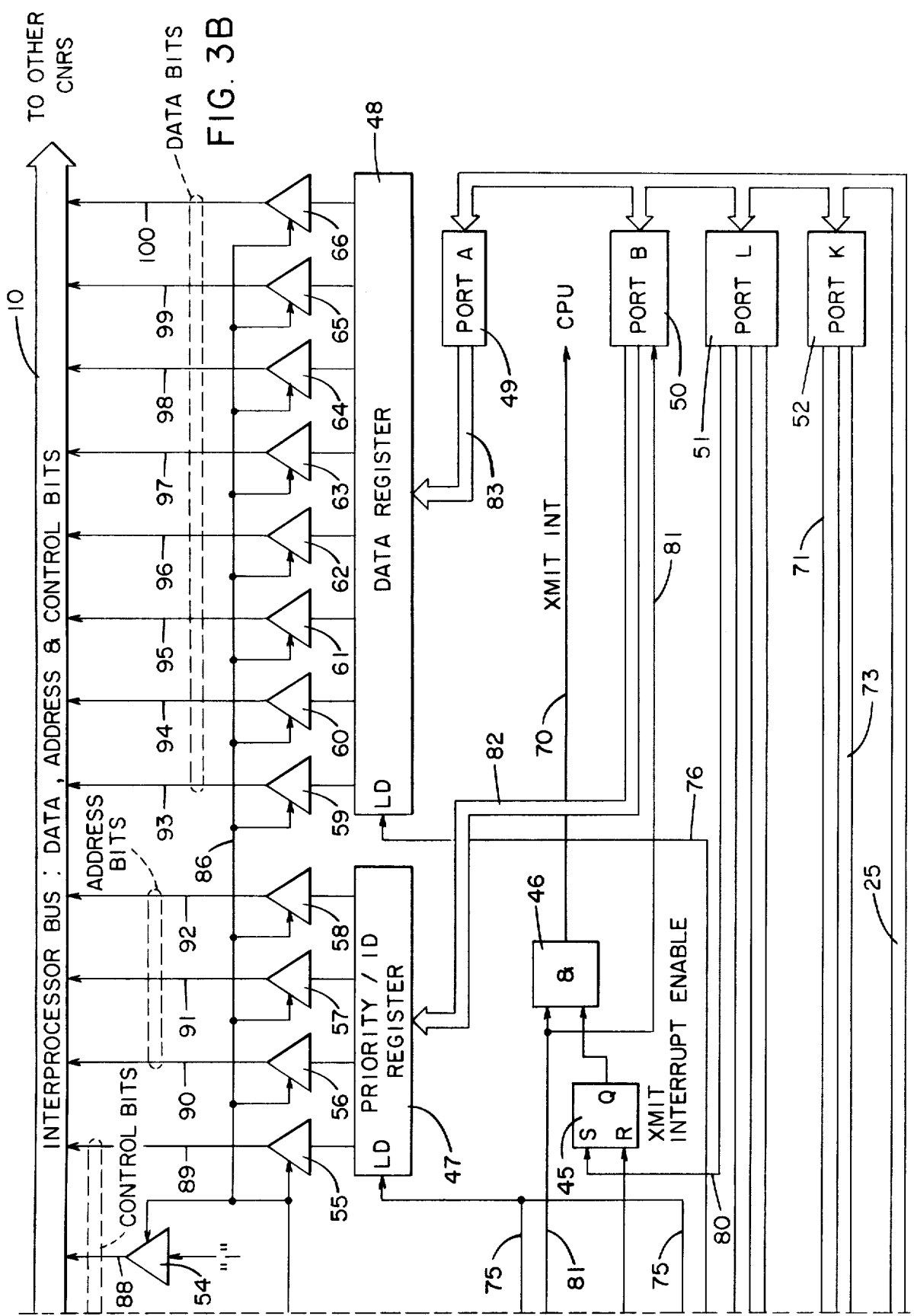

4,223,380

DISTRIBUTED MULTIPROCESSOR COMMUNICATION SYSTEM

FIELD OF THE INVENTION

The present invention relates to a distributed multi-data processor communication system, and is particularly directed to a scheme for carrying out communications between processor modules distributed along a commonly shared communications bus without the necessity of continuous monitoring of the system communication channel by individual processors to which messages may be addressed.

BACKGROUND OF THE INVENTION

With the development and expansion of computer terminal equipment, such as that employed in electronic point-of-sales terminals, the demand for terminals which are capable of performing a plurality of specialized tasks has resulted in the creation of equipment which contains a plurality of microprocessors, each of which may be tailored to perform one specific task within the overall system. Concomitant to this multi-processor configuration is the need for a communication scheme which affords rapid, real-time communications between the independent processors. In conventional systems, each processor, in addition to performing one dedicated function, has been burdened with the task of looking for intermodule communications to which it must respond.

Typically, data is placed on a common intermodule bus to which each processor module in the system is coupled. This data contains the address of a target module for whom the particular message is intended and all CPUs within the system decode the address portion of the message in order to ascertain for whom the data is intended. This means that all CPUs must continually look at the intermodule bus and decode data; yet, only that module for which the data is intended will respond. This conventional approach is time consuming, the microprocessor being inherently too slow to perform this task efficiently, and usually a great deal of software is required in order to distinguish between addresses or commands, and each CPU may be unnecessarily burdened.

Now, various attempts have been proposed to relieve the central processor of these communication channel monitoring duties. For example, the U.S. Pat. No. to Beausoleil et al. 3,400,372 describes a multi-data processing system wherein the interfacing of two processors is effected through a processor-to-processor adapter, which becomes coupled to each computer when an interprocessor communication is to proceed. This technique may be termed a quasi-third party control scheme since each processor communicates by way of the third party (the channel adapter) under CPU control. The system is limited in that it is strictly limited to interfacing two processors, the communication itself is dependent upon interrupt acknowledgement before proceeding and, once begun, both the transmitting processor and the receiving processor must suspend all other tasks until the message is complete.

The use of a third party interfacing scheme is also disclosed in the U.S. Pat. No. to Broderick et al. 3,483,520 which describes a "mail-box" technique of routing multi-processor communications. All communications are routed through a central control sub-system (CCS) which contains all the interfaces for the processors that form part of a "star" configured network. All communications depend on one element, the CCS, so that if it fails, all communications cease. Such an approach has obvious shortcomings.

The case of a common bus scheme to perform data transfers among individual modules units is described in the U.S. Pat. No. to Bergh et al. 3,820,079 which discloses a multiprocessing computer wherein communications within one computer are conducted by way of module control units, each of which communicates with other module control units. The modules themselves are not independent processors, however, and because of a priority scheme through which use of the bus is defined, intermodule communications are not guaranteed, but are subject to bus availability. This problem of bus-lockout also exists in the bus communication system described in the U.S. Pat. No. to Schlaeppi 3,480,914 which describes a scheme wherein individual bus adapters are employed for each processor. Each adapter or interaction control unit responds to commands appearing on the common bus transmitted from other adapters to permit seizure of the bus. It is not until an interaction control unit has completed its use of the bus that control of the bus may pass to another adapter.

A further system in which a common bus is used for multi-module coupling is described in the U.S. Pat. No. to Trantanella 3,470,542. However, rather than relate to communications between independent processors, this system is directed to the transmission of signals between module units such as keyboards, printers memory, etc.; at any given time, one of the modules assumes control of the entire system.

Thus, although various prior art systems include techniques developed to control communications between various units in a digital data handling system over a common communication channel, such systems have not provided an efficient scheme for guaranteeing communications between multiple processors over a common communication link, while also relieving the individual processors of having to continuously monitor the channel for communications, thereby impeding intended data processing functions.

SUMMARY OF THE INVENTION

In accordance with the present invention, in a distributed multiprocessor communication system the CPU is relieved of the burden of bus management by a scheme which multiplexes the interprocessor module communications bus, to which all processors are guaranteed access, so that only an addressed CPU is allowed to be interrupted from performing its dedicated data processing function. Associated with each independent processor is a communications interface unit or communications network routing unit which relieves the processor of the task of decoding communications on the interprocessor or intermodule communications bus and, in addition, upon decoding its address and buffering message data, generates a handshake over the bus back to the sender during a designated time slot, thereby informing the sender that the transmitted message was actually received. Moreover, if one module is in a high priority mode of communication with another module, all lower priority messages are prevented from entering that particular module; yet, any other pairs of modules may still communicate. In other words, no module can possible tie up the bus, preventing other modules from communicating.

Transmission, reception, priority discrimination, and handshake are completely independent of CPU operation once the data is placed on the bus system, so that the time required to transfer a data byte is independent of any processor in the system.

BRIEF DESCRIPTION OF THE DRAWINGS

FIG. 3, comprising FIGS. 3A and 3B, is a schematic diagram of the transmitter portion of a communications network routing (CNR) unit contained within an individual processor module; and FIG. 4, comprising

DETAILED DESCRIPTION

Figure 1:
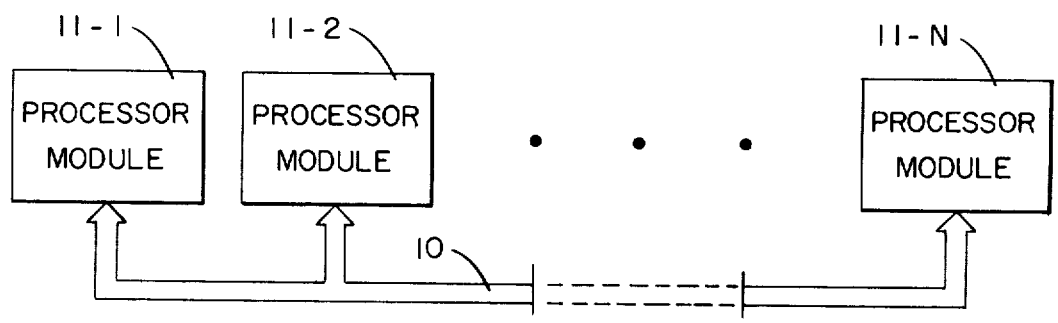
FIG. 1 is a block diagram of a distributed multiprocessor system having an interprocessor communications bus.

A distributed multiprocessor network is illustrated in FIG. 1 and may be comprised of an N number of independent processor modules 11-1 to 11-N, each of which modules is assigned the task of performing some specified function, through the use of its central processing unit (CPU), and which may be called upon by another module or itself may request another module to perform its own specified function in the course of system operation. The processor modules are distributed along an interprocessor bus 10 and communicate with one another through this commonly shared bus 10. In addition to a central processing unit, memory, and input/output (I/O) unit, each processor module may contain further functional processing units, such as keyboard control units coupled to a peripheral keyboard/display. Moreover, the I/O unit of each module may be coupled to a prescribed peripheral device, such as a printer or tapedeck, for example. Each individual processor module 11-1 to 11-N may be configured to be different from the rest so that the overall system may be tailored by a combination of those processor modules whose functions meet the criteria demanded by the user. Thus, a system may contain as few as one processor module, but usually contains a plurality of such modules whose total functional performance meets a multitude of user needs.

In order for a multiprocessor system to perform each of its intended functions, information must by capable of being transmitted to and from the various processor modules which make up the system, so that each module may cooperate with the other processor modules of the overall system and enable the system to perform all transactions for which it has been designed. Since the transmission of data, in and of itself, between processor modules, involves time not devoted to information processing, a reduction in the time required to effect communications between modules and relieving the processor module CPU of the task of overseeing and monitoring data transmission and reception are sought-after performance features for efficient system operation. These performance features are achieved in accordance with the present invention by incorporating into each processor module a further functional unit, hereinafter referred to as a communication network routing (CNR) unit, which relieves the CPU of the task of monitoring communications between separate processor modules and which operates so as to guarantee each processor module the same opportunity to use the interprocessor bus.

Figure 2:
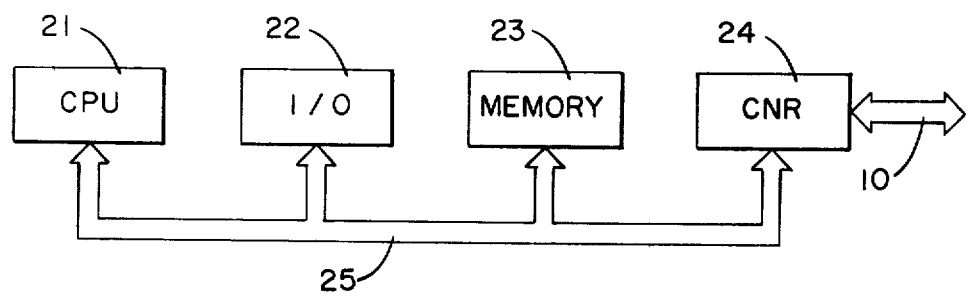
FIG. 2 is a block diagram of components of which an individual processor module in the distributed multiprocessor system shown in FIG. 1 may be comprised.

A block diagram of a typical processor module 11-1 to 11-N and the incorporation of a CNR into each processor module is illustrated in FIG. 2. As is shown therein, a CPU 21, I/O unit 22, memory 23, and CNR 24 are coupled to an intraprocessor bus 25 by way of which data, address, and control information are transmitted within the module itself. Intraprocessor bus 25 and the connections to it may be of a conventional configuration and, as such, do not form the subject matter of the present invention. Rather, the scheme by way of which a processor module communicates with another processor module is the subject matter to which the invention is directed and, accordingly, the following description will be directed to the details of the CNR and its operation in effecting transmissions between processor modules 11-1 to 11-N over intermodule bus 10.

The CNR 24 within each processor module responds to requests from its associated CPU 21 for communication with another processor module and also monitors the intermodule bus 10 for transmissions from other modules. For this purpose, each CNR contains transmitter, receiver, and associated control logic circuitry. In order to facilitate an understanding of the responsibilities of each CNR, the transmitter and receiver portions of a CNR will be separately described, followed by an explanation of system operation for an exemplary intermodule communication carried out by the CNRs of the transmitting and receiving processor modules, respectively.

CNR TRANSMITTER CONFIGURATION

Figure 3A:
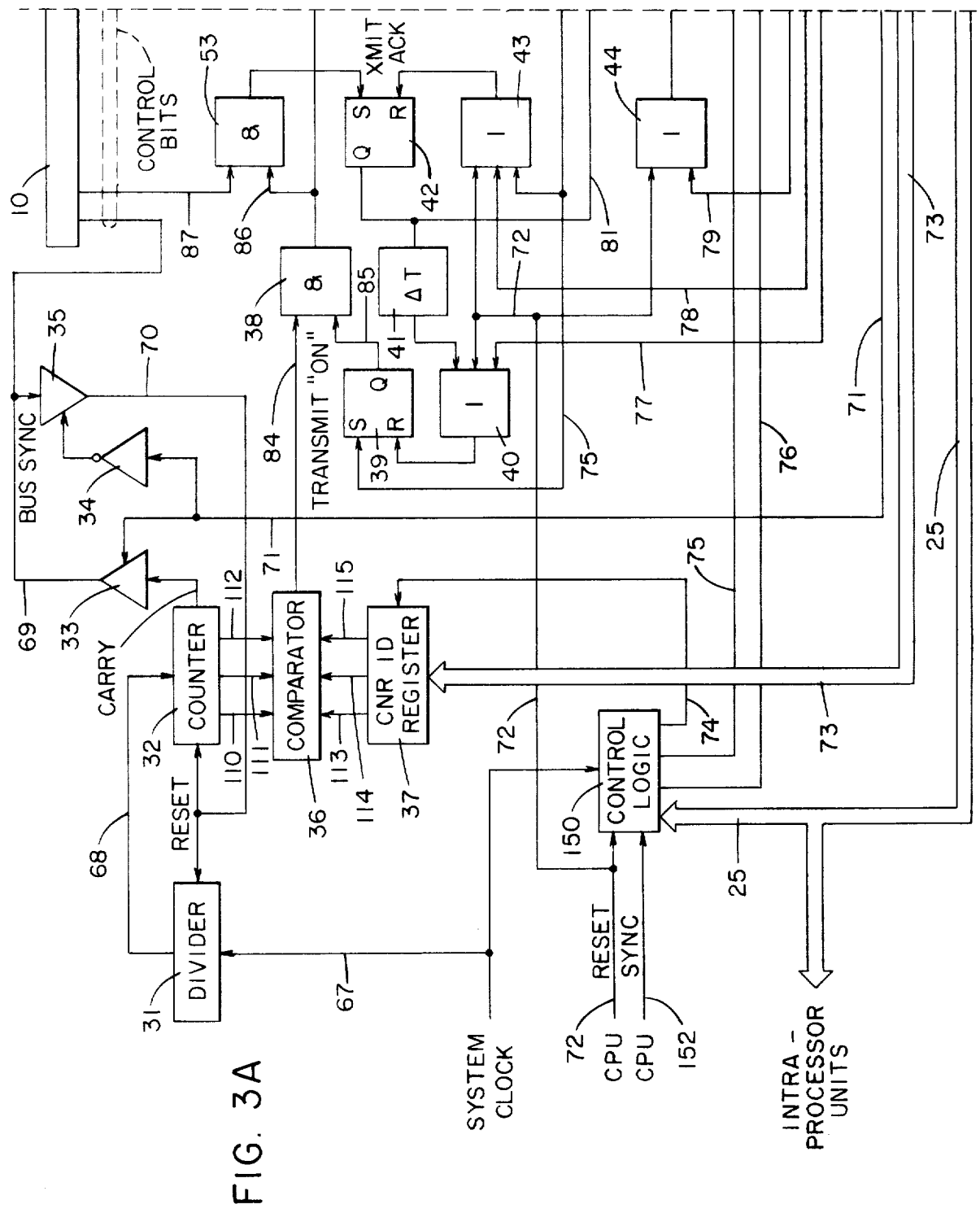
Figure 4A:
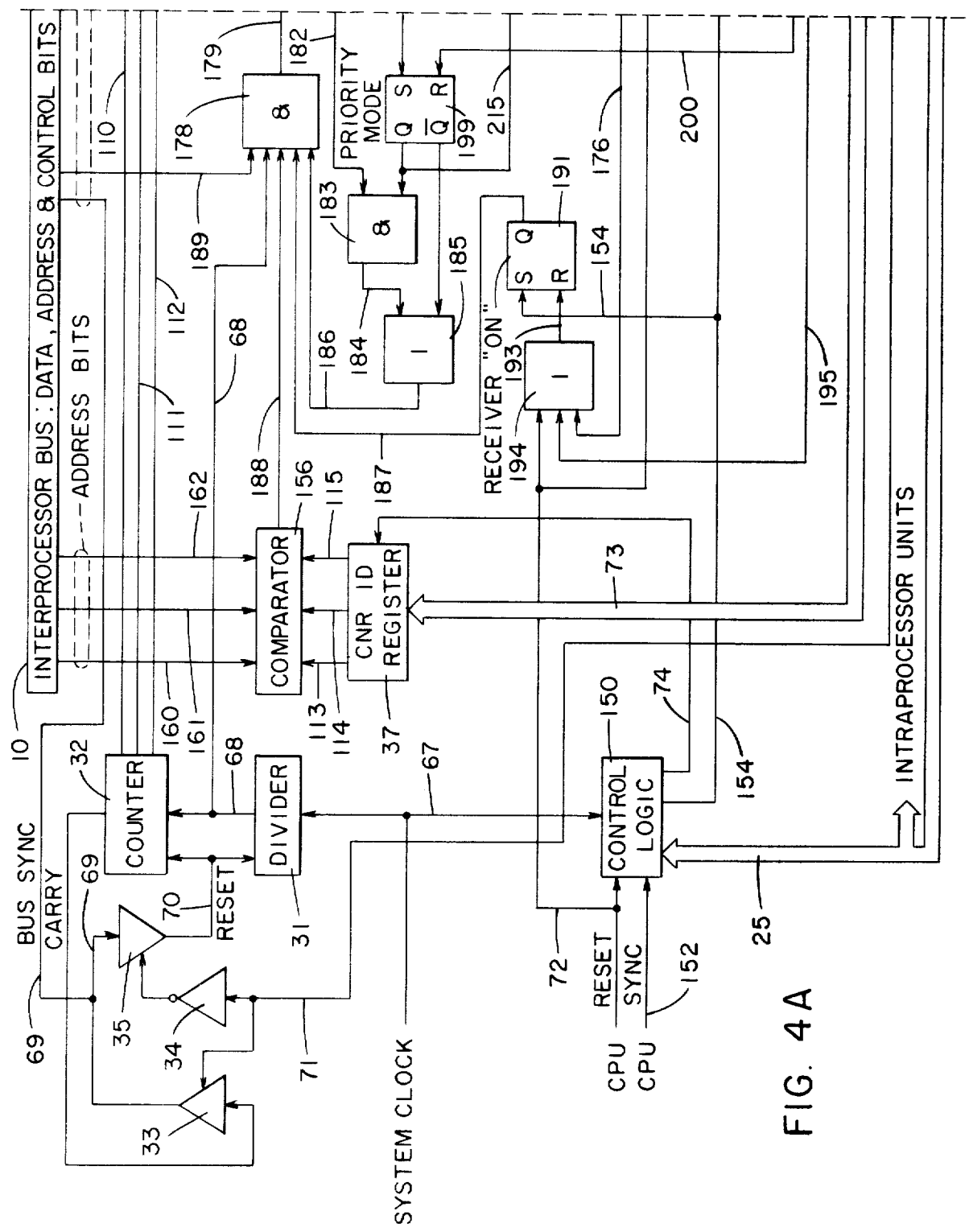
FIGS. 4A and 4B, is a schematic diagram of the receiver portion of a communications network routing (CNR) unit contained within an individual processor module.
Figure 4B:
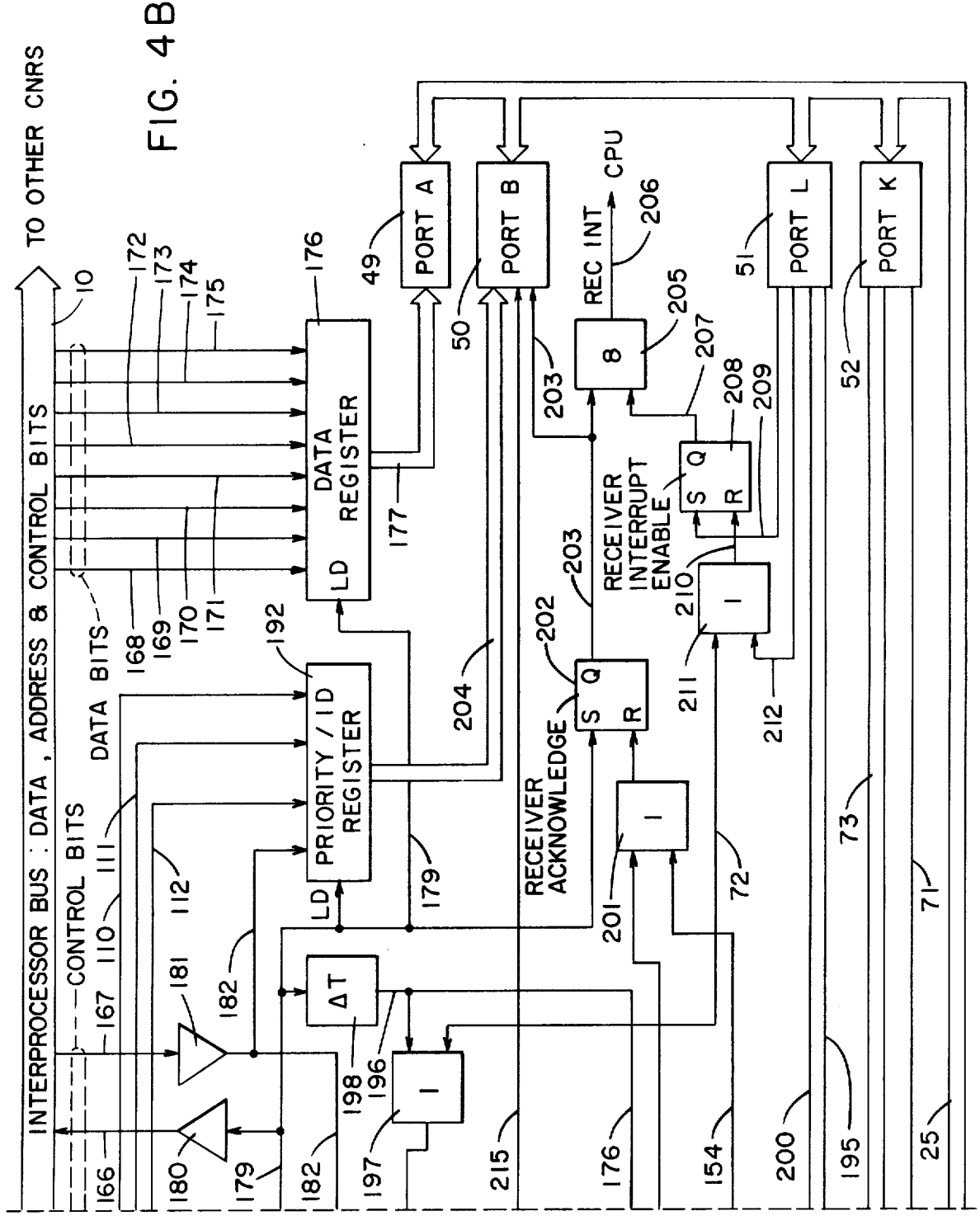

Referring now to FIG. 3, there are shown the circuitry components of the transmitter portion of a CNR 24 and the bus connections for both intramodule and intermodule communications. The CNR control circuitry which is common to both the transmitter and receiver portions of the CNR is illustrated in each of FIGS. 3 and 4 in order to facilitate a complete description of each of the transmitter and receiver operations, and duplication of the control circuitry components in FIGS. 3 and 4 is accompanied by the same reference numeral designations.

The interprocessor bus 25, by way of which communications within the processor module itself are carried out, is coupled via four separate ports 49 through 52, respectively designated as PORTs A, B, L, and K. PORT A 49 is a bidirectional data bus port which couples the data-conveying portion of bus 25 via lead 83 to data register 48 for buffering data prior to transmission. In the exemplary illustration shown, data register 48 is an eight-bit storage register, the contents of which are coupled via drivers 59-66 over lines 93-100, respectively, to the data-conveying portion of intermodule bus 10. Of course, the number of data bits is not limited to eight, but may be expanded or reduced to meet system design. The data itself, which is coupled to PORT A via intraprocessor bus 25, may be stored in memory 23 (FIG. 2) prior to transmission and read out a character at a time to be temporarily retained in register 48 for transmission. PORT B 50 is a bidirectional control bus port for controlling the priority and destination of data from one processor module's CNR to another processor module's CNR. Lead 82 represents a four wire path from PORT B to priority/I.D. (identification) register 47. Three of the wires carry a three bit binary code designating the address of the CNR for whom the transmission is intended, while the fourth bit is a priority bit representative of the mode of operation of the CNR. The contents of register 47 are coupled to intermodule bus 10 via drivers 55-58 and output bus leads 89-92.

PORT L 51 is a pulsed CNR control port which couples control signals from the CPU to various logic elements of the transmitter circuitry necessary for operation of the CNR. PORT K 52 is a latched data CNR control port for programming the identity of the processor module relative to the other modules in the system as assigned during initialization of the system. A three bit binary code generated at initialization is supplied over line 73 to CNR I.D. register 37. A further output of PORT K 52 is coupled via line 71 to driver 33 which is coupled to the carry output of a three bit binary counter 32 of the control logic portion of the CNR. The carry output of the counter 32 of one of the CNR units in a system is employed to control clock synchronization of all the other CNRs which are coupled to the intermodule bus 10; the occurrence of this "bus sync" signal is indicated to each processor of the system via a designated bit of PORT K which is coupled to driver 33 and inverter 34 via line 71. The output of inverter 34 controls driver 35, the output of which driver controls the resetting of divider 31 and counter 32. The processor module chosen as the bus sync control module has that bit of PORT K to which line 73 is coupled set to cause the carrying output of counter 32 to be coupled via line 69 to the interprocessor bus 10 for use by every other CNR, while the corresponding bit of PORT K of the other processor modules is set to inhibit the coupling of their counter 32 carry outputs to the interprocessor bus 10, while enabling driver 35 to couple the carry signal from the bus sync control module's counter 32 to be applied via line 70 to the reset inputs of their respective divider and counter circuits 31 and 32.

As has been mentioned previously, one of the advantageous features of the present invention is that each processor module is guaranteed the same opportunity to transmit information to another processor module. To this end, the fundamental control of the transmission of information from a CNR is effected by the n-bit counter 32 (three bits in the exammple illustrated) which counts clock pulses at a prescribed rate and recycles at capacity to begin counting anew (as a carry signal is generated). The various binary codes established by the n-bits of the counter 32 correspond to the respective addresses of the processor modules 11-1 to 11-N of the system. Thus, for a three bit counter 32, there are a maximum of eight codes that can be assigned as addresses of processor modules between which communications may take place. It is, however, to be understood that the invention is not limited to a system having a processor module capacity of eight, but may be expanded or reduced as the case demands, simply by varying the count capacity and corresponding I.D. codes for the processor modules.

Referring again to FIG. 3, the n-bit counter 32 is depicted as a three-bit binary counter which counts clock pulses supplied over line 68 from the divider circuit 31. Divider circuit 31 divides the processor system clock frequency supplied over line 67 (which clock controls the overall processor operations at a relatively higher rate) by a suitable number to thereby sequentially step through the addresses (or time slots) assigned to the respective CNRs, which permits the completion of necessary intramodule operations for information transmission (or reception). In order that a particular CNR 24 will known when to transmit, a comparator 36 is coupled via lines 110-112 to the respective stages of counter 32 and via lines 113-115 to the respective stages of register 37. When the contents of counter 32 match the processor I.D. stored in register 37, comparator 36 supplies an output over line 84 to one input of AND gate 38. The other input of AND gate 38 is coupled via line 85 to the Q output of TRANSMIT "ON" flip-flop 39. TRANSMIT "ON" flip-flop 39 is employed to turn-on the transmitter. Namely, unless flip-flop 39 is in the set state, that CNR is incapable of sending data to another processor module. The set input of flip-flop 39 is coupled via line 75 to a control logic circuit 150, while its reset input is coupled to the output of an OR gate 40. Control logic circuit 150 is coupled to the intraprocessor system bus 25 and to the CPU 21 via RESET and SYNC lines 72 and 152, and generates various control signals in accordance with the system clock so that the operation of the transmitter, as well as the receiver portion of the CNR, may proceed in a prescribed sequence. In order to provide a concise illustration and description of the invention the details of the control logic circuit 150, per se, have not been shown, particularly since its implementation may consist of straightforward combinational logic, given the input and output signals described herein. Basically, control logic circuit 150 supplies a signal on line 74 to load the data applied to PORT A in register 37. It also supplies a signal over the line 75 to the set input of TRANSMIT "ON" flip-flop 39, to the load or write input of register 47, and to one input of an OR gate 43, the output of which gate 43 is coupled to the reset input of a TRANSMIT ACKNOWLEDGE flip-flop 42. TRANSMIT ACKNOWLEDGE flip-flop 42 serves the purpose of storing an indication of whether or not a transmitted character has been received or captured by the processor module for whom the message was intended.

The Q output of TRANSMIT "ON" flip-flop 39 is coupled over line 85 to one input of AND gate 38 so that, in response to an output over line 84 from module I.D. comparator 36, and with TRANSMIT "ON" flip-flop 39 having been set, AND gate 38 will supply an enable signal via line 86 to AND gate 53 and driver circuits 54-66. Driver 54 is hardwired to a "1" bit input and its output is coupled to the intermodule communication bus 10 via line 88, to indicate that the contents of the priority bit, the destination receiver I.D. bits, and the data bits of the intermodule communication bus 10 represent valid information. The second input to AND gate 53 is coupled to a "handshake" lead of the interprocessor bus 10 via line 87. If the processor module for whom the transmitted information is intended actually receives (or captures) the transmitted data, it will indicate receipt of the data via the handshake lead, thereby causing line 87 to go high and an output signal will be generated by AND gate 53 to set TRANSMIT ACKNOWLEDGE flip-flop 42, causing its Q output to go high and thereby inform the transmitting module of receiver data capture. The output of flip-flop 42 is coupled over line 81 to one-shot or delay circuit 41, one input of AND gate 46, and to one bit of PORT B 50. The output of delay 41 is coupled over line 101 to one input of OR gate 40. After a prescribed interval, subsequent to the receipt of a handshake signal, which sets TRANSMIT ACKNOWLEDGE flip-flop 42, one-shot 41 generates an output which is coupled via OR gate 40 to reset flip-flop 39. Flip-flop 39 is also reset via OR gate 40 by the processor reset signal coupled over line 72 from the CPU. This processor reset signal is further coupled via OR gate 44 to the reset input of TRANSMIT INTERRUPT ENABLE flip-flop 45. TRANSMIT INTERRUPT ENABLE flip-flop 45 latches a control input from PORT L to either enable or inhibit the gating of a transmit acknowledge signal provided at the Q output of TRANSMIT ACKNOWLEDGE flip-flop 42 via AND gate 46 over line 70 to the CPU. If an interrupt signal is to be coupled to the CPU upon the completion of a data transfer, that bit of PORT L which is coupled to line 80 is enabled, thereby setting TRANSMIT INTERRUPT ENABLE flip-flop 45 and enabling AND gate 46. If an interrupt signal is not to be coupled to the CPU upon the completion of a data transfer, that bit of PORT L which is coupled to line 79 is enabled, thereby resetting TRANSMIT INTERRUPT ENABLE flip-flop 45 via OR gate 44 and disabling AND gate 46. PORT L also includes a pair of additional bit signals coupled to lines 77 and 78 for respectively resetting TRANSMIT "ON" flip-flop 39 via OR gate 40 and TRANSMIT ACKNOWLEDGE flip-flop 42 via OR gate 43. The setting of that bit of PORT L to which line 77 is coupled disables the transmitter, since TRANSMIT "ON" flip-flop 39 is reset, while the setting of that bit of PORT L to which line 78 is coupled clears or resets the TRANSMIT ACKNOWLEDGE flip-flop 42.

CNR RECEIVER CONFIGUATION

Referring now to FIG. 4, there are illustrated the circuitry components of the receiver portion of the CNR and the bus connections for both intramodule and intermodule communications. As was the case with the connections between the intraprocessor bus 25 and the logic elements of the transmitter, the transfer of address, data, and control signals between the CNR receiver and the intraprocessor bus 25 is effected through PORTS A, B, L, and K. PORT A 49 is coupled via lines 177 to data register 176, into which data from another processor module 11-1 to 11-N is loaded by way of data inputs 168–175 from the interprocessor bus 10. Thus, whereas in the transmitter, bidirectional data PORT A is used to couple data on the bus 25 to outgoing data register 48 (FIG. 3), in the receiver such PORT A couples incoming data, which has been latched in register 176, onto bus 25. The data-conveying portion of bus 25 may be coupled via the CPU 21 to a message buffer portion of memory 23 (FIG. 2) assigned for storage of data characters in sequential order as they are received, so that they may be suitably processed by the receiver's CPU.

PORT B 50 is coupled via lines 204 to priority/I.D. register 192, via line 215 to the Q output of PRIORITY MODE flip-flop 199, and via line 203 to the Q output of RECEIVER ACKNOWLEDGE flip-flop 202. PRIORITY MODE flip-flop 199 governs whether or not an incoming message character may be accepted or captured by the receiver. To this end, PRIORITY MODE flip-flop 199 latches the priority which incoming message characters must possess in order to be captured. When PRIORITY MODE flip-flop 199 is in the reset state, characters of either low or high priority may be captured. However, when PRIORITY MODE flip-flop 199 is in the set state, only message characters having high priority may be captured. Since priority protocol of the present communication system establishes the first character of a message as a low priority character, and all subsequent characters as high priority characters, PRIORITY MODE flip-flop 199 is set upon capture of the first character of a message thereby preventing entry of messages from other processor modules until the communication presently being received is completed.

RECEIVER ACKNOWLEDGE flip-flop 202 is employed to indicate whether or not the receiver has captured a message character. Normally, RECEIVER ACKNOWLEDGE flip-flop 202 is reset, but becomes set upon capture of a message character. This acknowledgement of receipt of a message character, in turn, is indicated to PORT B and may cause a maskable interrupt to be supplied to the CPU. Thus, the states of the stages of register 192 and flip-flops 199 and 202 are coupled through PORT B to intraprocessor bus 25 to inform the CPU of the address of the transmitting processor module, whether data from that transmitting processor module may be accepted (i.e. the priority of the message character), and whether the data is being accepted. PORT L 51 is used to couple control signals from the CPU to various logic elements of the receiver. These control signals are used to preset the states of flip-flops 191, 199, and 208 via lines 195, 200, 209, and 212. When the bit to which line 195 is connected is set, the receiver is effectively turned off by the resetting of RECEIVER "ON" flip-flop 191 via OR gate 194 and reset control line 193. Namely, RECEIVER "ON" flip-flop 191 latches the permitted operating condition of the receiver. When RECEIVER "ON" flip-flop 191 is set, the receiver is effectively turned on and monitors the interprocessor bus 10 for message characters addressed to it. When RECEIVER "ON" flip-flop 191 is reset, the receiver is effectively turned off and cannot accept message characters addressed to it.

When the bit of PORT L to which line 200 is connected is set, PRIORITY MODE flip-flop 199 is reset. The respective bits of PORT L to which lines 209 and 212 are coupled are used to reset or set RECEIVER INTERRUPT ENABLE flip-flop 208 and thereby control whether an interrupt will be coupled to the CPU via line 207, AND gate 205, and output line 206, when flip-flop 202 is set as the receiver acknowledges receipt of a data transmission. Namely, RECEIVER INTERRUPT ENABLE flip-flop 208 is a controllable mask for interrupt signals to the CPU which are generated whenever there is a data capture. PORT K 52 is again used to load the address assigned to the particular CNR into I.D. register 37 via line 73 and the bus sync control bit status to the control circuitry via line 71.

I.D. register 37, which is common to the CNR transmitter and receiver (FIGS. 3 and 4), stores its identifying address supplied via PORT K and couples the bit values defining the address over lines 113–115 to comparator 156 (FIG. 4). Comparator 156 is coupled via input leads 160–162 to the destination I.D. bits of the interprocessor bus 10 and generates an output on lead 188 whenever the address defined on inputs 160–162 matches the address contents of register 37, whereby the receiver will be informed that another processor module 11-1 to 11-N is transmitting a message to it.

Output lead 188 is coupled to an input of AND gate 178. Another input of AND gate 178 is coupled via line 68 to the output of divider 31, so that AND gate 178 is enabled in synchronism with the CNR clock. Input lead 189 of AND gate 178 is coupled to the bus active bit of the interprocessor bus 10 indicating the validity of data, priority, and I.D. information on the bus 10. Still a further input lead 187 of AND gate 178 is coupled to the Q output of RECEIVER "ON" flip-flop 191, while a final input lead 186 of such gate 178 is coupled to the output of OR gate 185. One input of OR gate 185 is coupled via lead 190 to the Q output of PRIORITY MODE flip-flop 199, while a second input of OR gate 185 is coupled via lead 184 to the output of AND gate 183. One input of AND gate 183 is coupled to the Q output of PRIORITY MODE flip-flop 199 while another input is coupled via lead 182, driver 181, and lead 167 to the priority bit of the interprocessor bus 10. The output of driver 181 is also coupled via lead 182 to the priority bit stage of register 192. AND gate 178 is the basic operational control gate for the receiver (FIG. 4) and permits or inhibits receiver operation depending upon whether the receiver has been enabled, whether it has been addressed by another CNR, and whether or not it is still in the process of receiving information from another CNR. In this latter instance, the priority mode will be such that data will continue to be accepted only from that transmitting CNR from which data has already been accepted by the receiver, until the communication has been completed or aborted. Namely, the already-communicating processor module 11-1 to 11-N has preference (by virtue of the high priority mode of its message character) over all others attempting to communicate, so that even if comparator 156 generates an output on lead 188 indicating that a CNR of another processor module has addressed a communication to it, gate 178 may be disabled by PRIORITY MODE flip-flop 199 indicating that the newly transmitting CNR does not have high priority and therefore must wait until the processor module which has priority has finished transmitting a complete message.

The output of AND gate 178 is coupled over line 179 to driver 180, the output of which is coupled via lead 166 to the "handshake" bit of interprocessor bus 10. Lead 179 is further coupled to load or write inputs of registers 192 and 176, and to a delay or one-shot 198. The output of one-shot 198 is coupled over lead 196 to OR gates 197 and 194. After a prescribed period of time, subsequent to receipt of an output from AND gate 178, one-shot 198 couples a pulse via OR gates 197 and 194 to respectively set PRIORITY MODE flip-flop 199 and reset RECEIVER "ON" flip-flop 191. The delay provided by one-shot 198 is sufficient to cover the time span of an individual time slot during which data from a transmitting CNR is accepted or captured in the receiving CNR, a receiver acknowledge signal is latched by flip-flop 202, an interrupt is coupled to the CPU, and a handshake signal is sent back to the transmitting processor module. OR gates 194 and 197, as well as OR gates 201 and 211, are also coupled to the processor module reset line 72 which presets the stages of each of flip-flops 191, 199, 202, and 208 during initialization.

The set input of RECEIVER "ON" flip-flop 191 is coupled over lead 154 to conrol logic circuit 150, so that the receiver portion of the CNR may be effectively turned on to look for incoming messages under control of its CPU. The signal on lead 154 is also coupled via OR gate 201 to the reset input of RECEIVER ACKNOWLEDGE flip-flop 202. The Q output of RECEIVER ACKNOWLEDGE flip-flop 202 is coupled over the lead 203 to AND gate 205 and to a preselected bit of PORT B 50. When RECEIVER ACKNOWLEDGE flip-flop 202 is set by an output signal over line 179 from AND gate 178, indicating that this CNR has been addressed and is accepting data, a receiver acknowledge indication is supplied to PORT B to provide status information for non-interrupting receiver routines or shared usage of an interrupt vector. Depending upon whether the interrupt enable bit has been set via PORT L, a receiver interrupt signal may be coupled to the CPU via AND gate 205 in accordance with the preset state of RECEIVER INTERRUPT ENABLE flip-flop 208.

OPERATION

Considering now the operation of the intermodule or interprocessor communication system in accordance with the present invention, let it be assumed that an exemplary terminal is configured to consist of five processor modules 11-1 through 11-5. Every terminal will contain at least one processor module having the basic components shown in FIG. 2, and usually one or more additional processor modules which, in addition to comprising the basic components shown in FIG. 2, may be coupled with optional peripheral units such as tapedecks, printers, cash drawers, etc. For the purpose of providing a systematic technique by way of which intermodule communications are to proceed, one processor module of each terminal, hereinafter referred to as a main processor board (MPB), may be given the task of assigning addresses or time slots to the various processor modules of which that terminal is comprised. Every other processor module of the terminal will be hereinafter designated as an optional peripheral functional (OPF) module. Thus, for the five module example chosen, one MPB will be distributed together with four OPFs along the intermodule bus 10.

Since the manner in which addresses may be assigned to the various processor modules is essentially a special purpose data processing operation, and is not necessary for an understanding of the present invention, a description of this particular task which may be carried out by the CPU of the MPB will be omitted. Let it be assumed that each of the five processor modules of the system has been assigned an address or time slot. By virtue of established protocol, the MPB may be assigned the address 000 with the remaining addresses 001 to 100 being sequentially assigned to up to the four OPFs. It is understood that if the system contained eight processor modules the MPB may be assigned the address 000 with the remaining addresses 001 to 111 being sequentially assigned to the seven OPFs in the system. Preferably, the addresses are assigned according to an established rank given to the particular type of module incorporated in the system as established by a predetermined format assigned to the overall functions and/or peripheral equipment coupled to the module. Now, in the exemplary illustration of the operation of the system, let it be assumed that OPFs 001 and 100 wish to communicate with, or send a message to, OPF 010. These messages may be requests for the transfer of information from the addressed CPU, the use of its associated peripheral equipment, a request for its assigned processor operation, etc. The present invention is not directed to the data processing operations of the modules themselves, but rather with the manner in which messages are conveyed between modules, so that a description of the contents of a message is not necessary for an understanding of the communic action technique involved. However, for purposes of illustration, let it be assumed that a typical message is arranged such that the first data word comprises a message control character containing the message length (the total number of data words making up the message so that the message buffer in the addressed processor module can assign successive memory locations for storage and will know when the last message character has been received, thereby concluding the message).

Now, initially, each CNR may be cleared so as to be ready to receive a message from another processor module which may require the assistance of one or more of the independent processor modules and/or any associated peripheral devices of the system. After initialization, each CNR I.D. register 37 will be loaded with an address corresponding to one of the eight three-bit binary numbers or clock counts to be periodically generated by counter 32. These bits are loaded via lines 73 from PORT K. Thus, the CNR I.D. register 37 for OPF 001 will contain binary word 001. Similarly, the CNR I.D. registers 37 of the other four modules, including the MPB, will contain their time slot-representative addresses. Assuming that the control circuitry from the MPB also is used for bus sync purposes, line 71 from PORT K for each of the OPFs of the system will not be set, so that the reset signal for counter 32 and divider 31 is derived via the bus sync bit of the interprocessor bus 10 from the MPB (having time slot or address I.D. 000) coupled thereto via line 69, enabled driver 35, and reset input line 70.

Looking now at the state of the transmitter and receiver portions of each module, since it has been assumed that only processors 001 and 100 wish to transmit, then the other CNRs have their transmitters turned off while all CNRs are placed in a receiver ready condition, i.e. they are caused to monitor the interprocessor bus 10 for messages. Therefore, the transmitters of the MPB (I.D.=000) and OPFs 010 and 011 are turned off, while the transmitters of OPFs 001 and 100 are turned on and loaded with the first character of a message to be transmitted to OPF 010. The conditions of these respective transmitters and receivers is as follows.

TRANSMITTER TURNED OFF

Originally, at initialization, the RESET line 72 from the CPU had cleared each of the TRANSMIT "ON" flip-flop 39, TRANSMIT ACKNOWLEDGE flip-flop 42, and TRANSMIT INTERRUPT ENABLE flip-flop 45. Thus, control AND gates 38, 53, and 46 are disabled, preventing transmitter operation. No control information need be applied via PORT L since the transmitter circuitry has already been effectively disabled.

TRANSMITTER READY

Since OPFs 001 and 100 wish to transmit messages to OPF 010, their respective transmitters are to be loaded with the destination I.D., applicable priority, and the first word of data to OPF 010. Thus, PORT A of each of OPFs 001 and 100, which must necessarily be written prior to turning the transmitter on, will supply the first eight bits of data words, to be placed on bus 10, to their respective registers 48. Also, via PORT B, register 47 is supplied with the destination I.D. 010. The priority of the first character of each message is set to be low priority. All characters subsequent to the first character are assigned a high priority, so that the priority bit in register 47 is loaded with a "1" for all such characters. As a result, once a receiver accepts or captures data and goes into a high priority mode of reception, new characters of low priority will be ignored until the current message has been completed or aborted.

PORT L will supply a control bit signal over one of lines 79 or 80 to set or reset TRANSMIT INTERRUPT ENABLE flip-flop 45 and thereby enable a transmission achnowledge interrupt to be supplied to the CPU upon the destination CNR having indicated by way of a handshake signal that it has accepted data. Thus, depending upon whether or not the CPU wishes to monitor the fact that the processor module to which the message is sent has received the message, PORT L will selectively disable or enable AND gate 46 by controlling the state of flip-flop 45. Here it will be assumed that the CPU in each of processor modules 100 and 001 wishes to monitor when module 010 captures data so that a set enable signal will be supplied via line 80 to flip-flop 45, thereby enabling one input of AND gate 46. In other words, the transmit interrupt line is not masked. Further, since the CNR I.D. address code and bus sync control signal are loaded via PORT K, the transmitters of each of OPFs 100 and 001 are now PORT-readied for transmitting the first character of a message.

TRANSMITTER TURNED ON

In response to the SYNC input signal over line 152 from its CPU, the conrol logic circuit of each of OPFs 001 and 100 loads registers 47 and 48 with the information at PORTs A and B via load (or write) enable lines 75 and 76, respectively. In addition, the signal on line 75, which loads the destination I.D. and priority bits into register 47, sets TRANSMIT "ON" flip-flop 39, thereby enabling one input of AND gate 38.

FIRST DATA CHARACTER TRANSMISSION

As counter 32 counts the clock pulses suppled over line 68, comparator 36 compares the contents of CNR I.D. register 37 with the contents of counter 32. Since OPF 001 is the first processor module in the numerical counting order (000, 001, 010 . . . 111) which wishes to transmit, upon its comparator 36 generating an output pulse on line 84 at time slot 001, AND gate 38 will supply a strobe output signal on line 86 and thereby place the contents of registers 47 and 48 together with a bus active bit "1" on the intermodule bus 10. Subsequently, at time slot 100, comparator 36 in OPF 100 (the next transmitting module in the numerical time slot order) will generate an output on line 84, enabling its AND gate 38 and placing the contents of its registers 47 and 48, as well as the bus active bit "1", on the interprocessor bus 10. One input of AND gate 53 in each of the transmitters in the CNRs of OPFs 001 and 100 is also enabled so that AND gate 53 is ready to acknowledge a handshake from the destination I.D. (OPF 010) whereby the transmission may proceed to the second message character. Since subsequent operation of the transmitters of OPFs 001 and 100 depends upon whether or not the transmitted first data character was received by destination OPF 010, the operation of the receiver will next be described.

RECEIVER TURNED ON

As explained above, via intraprocessor bus 25, register 37 of the CNR of each processor module is loaded with that CNR's own unique I.D. code, and bus sync control is established via PORT K; also, the CPU RESET signal on line 72 will have cleared or reset, via respective OR gates 194, 201, and 211, each of the RE- CEIVER "ON" flip-flop 191, the RECEIVER ACKNOWLEDGE flip-flop 202, and the RECEIVER INTERRUPT ENABLE flip-flop 208. In addition, the PRIORITY MODE flip-flop 199 will have been set via OR gate 197. Also, no characters have yet been loaded into registers 192 and 176 since AND gate 178 is disabled. Depending upon present CPU operation, PORT L will enable one of lines 209 or 212 so that it may selectively monitor a receiver interrupt indicating that data from another processor module has been captured, so that the CPU may take action or wait until it has completed its present data processing operation if interrupts are masked. Usually, that bit of PORT L to which line 200 is coupled will be a zero, so that the state of PRIORITY MODE latch 199 will remain unchanged. The receiver is in a low priority mode between messages so that a low priority character may be accepted at the start of a new message. The Q output of PRIORITY MODE flip-flop 199 goes high upon the receiver's acceptance of a character, as peviously described. The $\overline{Q}$ output remains high, inhibiting the acceptance of a low priority character via AND gate 183, until line 200 from PORT L is set high to reset the PRIORITY MODE latch 199 at the completion of a message.

In response to the sync signal from the CPU, control logic circuit 150 supplies an output on line 154, which sets the RECEIVER "ON" flip-flop 191 and turns on the receiver, thereby enabling that input of AND gate 178 which is connected to line 187. The receiver in each module is now ready to capture data addressed to it.

RECEIVER DATA CAPTURE

Once a CNR has been initialized and loaded with its CNR I.D., its receiver comparator 156 proceeds to monitor the destination I.D. bits of the interprocessor bus 10 for destination codes corresponding to the address stored in CNR I.D. register 37. Should comparator 156 recognize a match, it generates an output on line 188. Since, in the working example described herein, the only destination I.D. code which is generated is that of OPF 010, only the comparator 156 of OPF 010 will supply an output signal via line 188 to AND gate 178. This match signal will be first generated during time slot 001, when OPF 001 has placed its first message character on the interprocessor bus 10 and is waiting for a handshake from its transmitted destination I.D. (OPF 010). Thus, because the counters 32 in all the processor modules are synchronized by a common bus sync signal, the contents of counter 32 in OPF 010 will be the binary number 001 at the time that comparator 156 generates a match recognition signal on line 188. Since the bus active bit of the interprocessor bus is a "1", lead 189 will be high and AND gate 178 will generate an output in synchronism with the clock signal on line 68 from divider 31. The output signal from AND gate 178 is applied on line 179 to bus driver 180, one-shot 198, the load or write enable inputs of registers 192 and 176, and the set input of RECEIVER ACKNOWLEDGE flip-flop 202. Therefore, data register 176 is loaded with the first data word on the eight bit data portion of interprocessor bus 10, and priority/I.D. register 192 is loaded with the contents (001) of counter 32 and the low priority-representative zero bit on lead 167 via driver 181 and line 182. The characters captured or accepted in registers 192 and 176 represent both the priority and the source of the message (i.e. who sent the message) and a data character of the message, respectively. The contents of registers 192 and 176 may now be read out onto the system bus and the data stored in a message buffer, which may be part of a random access memory of which memory unit 23 (FIG. 2) is comprised, for subsequent processing by the CPU, as explained previously.

After a delay sufficient to permit interrupt latching and return of a handshake to the transmitting module, namely, all necessary signaling, one-shot 198 supplies a pulse via OR gate 197 to reset RECEIVER "ON" flip-flop 191 and set PRIORITY MODE flip-flop 199, and thereby turn off the receiver while PORTS A and B are read out to also prohibit the receiver from accepting messages of low priority (priority bit zero). In the latter instance, with flip-flop 199 set, the enabling of AND gate 178 will be dependent upon the enabling of AND gate 183, one input of which is coupled to the priority bit of the intermodule bus via line 182, driver 181, and priority bit lead 167.

The output of AND gate 178, which initiated the timeout action of one-shot 198, also placed a handshake signal on line 166 via driver 180 and caused a RECEIVER ACKNOWLEDGE level to be applied via line 203 to one bit of PORT B and to AND gate 205, so that both the transmitting module and the receiver's CPU may be advised of the data capture.

FIRST DATA CHARACTER TRANSMISSION, CONTINUED

When the receiver for which the transmitted message is intended has indicated that it has captured data by placing a handshake signal on the intermodule bus 10, this handshake signal is coupled via line 87 to enable AND gate 53 which supplies a set input signal to the TRANSMIT ACKNOWLEDGE flip-flop 42 in the CNR of the transmitting module. Therefore, for the example described, with OPF 010 having captured data, it places a handshake signal on the interprocessor bus 10, and transmitting OPF 001 acknowledges the handshake by setting its TRANSMIT ACKNOWLEDGE flip-flop 42. With TRANSMIT ACKNOWLEDGE flip-flop 42 having been set, AND gate 46 becomes enabled, so that PORT B will couple a transmission acknowledge signal over the intraprocessor bus 25 and a transmit interrupt will be provided via line 70 to the CPU via AND gate 46, TRANSMIT INTERRUPT ENABLE flip-flop 45 having been set via line 80 from PORT L, as explained previously. After a prescribed time-out period, delay circuit 41, which is also coupled to the Q output of TRANSMIT ACKNOWLEDGE flip-flop 42, resets the TRANSMIT "ON" flip-flop 39 via OR gate 40. AND gate 38 becomes disabled, so that any further transmission from OPF 001 must await a new control signal from control logic 150, which turns on the transmitter via line 75. Thus, the transmitter of OPF 001 will remain quiescent until new characters, including the second data character, have been loaded in registers 47 and 48, and appropriate control signals have been loaded, via PORTs A and B from the intraprocessor bus 25, and the time slot I.D. corresponding to OPF 001 is supplied by counter 32 to comparator 36.

DATA REJECTION

As was described earlier, as counter 32 in each OPF continues to count the divided clock pulses, no further transmission on interprocessor bus 10 occurs until the count reaches 100, during which time-slot OPF 100, which also wishes to communicate with OPF 010, places its first message character containing a low priority bit, data, bus active, and destination I.D. information on interprocessor bus 10. During time-slot 100, the receiver comparator 156 in OPF 010 again recognizes its own I.D. 010 as the destination I.D. in a message from a transmitting module, the source I.D. 100 of the transmitting module being applied to register 192 via lines 110, 111, and 112 from counter 32 at this time. Thus, AND gate 178 receives enable signals from the bus-active input line 189, line 68 from divider 31, line 188 from comparator 156, and line 187 from RECEIVER "ON" flip-flop 191 (assuming that the contents of registers 176 and 192 have been read out via PORTs A and B and the receiver has again been turned on). In this regard, depending upon the intraprocessor bus 25 processing time, a plurality of count cycles of counter 32 may elapse until the receiver is again turned on. However, for purposes of illustration of the operation of the system, particularly the effect of the priority mode of the character transmitted, let it be assumed that PORTs A and B have been read and that the RECEIVER "ON" flip-flop 191 has again been set. Now, since PRIORITY MODE flip-flop 199 was set by the capture of data from OPF 001 and the processor module units of OPF 010 were informed of this via line 215 and PORT B, subsequent receiver-on preconditioning of the receiver via PORT L has been such that the bit of PORT L to which the reset input of PRIORITY MODE flip-flop 199 is coupled via line 200 has not reset PRIORITY MODE flip-flop 199, so that it remains in its set or high priority state, enabling one input of AND gate 183. The other input of AND gate 183 looks at the priority bit of the message character from OPF 100, via line 182, driver 181, and line 167. Since the message character from OPF 100 is its first message character having a priority of zero, of low priority, AND gate 183 remains disabled, so that OR gate 185 receives no input by which AND gate 178 can become enabled, and data capture does not occur. Therefore, no handshake signal is returned from OPF 010 to transmitting OPF 100, the TRANSMIT ACKNOWLEDGE flip-flop 42 in OPF 100 remains reset, and its processor module is informed, via PORT B, that data capture did not occur. When the transmitter of OPF 100 does not receive a handshake during its transmission time-slot 100 and is thereby advised that the receiver of OPF 010 failed to capture the message character sent to it, OPF 100 waits until its next transmission time-slot 100 and repeats the previous transmission. This process continues until a handshake is received or the transmission is aborted by the CPU of OPF 100.

SECOND AND SUBSEQUENT DATA CHARACTER TRANSMISSION AND RECEPTION

As was described previously, the first message character of each transmission is assigned a low priority while all subsequent characters are assigned high priority. Therefore, when the second and all subsequent message characters are loaded into the registers 47 and 48 of OPF 001, the priority bit supplied via PORT B is set for a high priority mode transmission. The first data character defines the length of the message, so that, at the receiving OPF (here OPF 010), the message buffer into which data characters are loaded may be assigned a corresponding number of addresses, with the loading of data into the last assigned address indicating the completion of the message, so that the CPU of OPF 010 will know it has a complete message stored in memory.

As these high priority message characters are supplied to OPF 010, they are permitted to be captured, since the state of line 182 carrying the priority level of the message character being sent represents high priority mode, thereby enabling AND gate 183 and, consequently, AND gate 178, so that the previously described reception or capture of data may proceed. A handshake is therefore returned to OPF 001 and the third and subsequent data characters are transmitted to OPF 010 until the message is completed. During the time that OPF 001 is transmitting to OPF 010, all other OPFs are prevented from communicating with OPF 010 because the priority of the first character of the message they are attempting to transmit to OPF 010 is less than the priority of the second and subsequent characters of OPF 001, so that OPF 001 is allowed to complete its transmission to OPF 010 before others may proceed. However, communications between other OPFs are possible during each time-slot count cycle, since each processor module addresses only one other processor module at a time, whereby for an eight module address scheme, as used in the present example, up to eight independent communications, each including message character transmission, data capture, and handshake, may take place.

At the end of a communication, after PORTs A and B have been read out for the last captured character of the message, control signals are applied via PORT L to place the receiver in the low priority mode so that it may again monitor messages from all other modules and be capable of accepting new messages.

As will be appreciated from the foregoing description of the circuitry configuration and operation of the distributed multi-data processor communication system in accordance with the present invention, communication interface units or communication network routing units are provided as part of each data processor module and perform the necessary bus management responsibilities previously carried out by the modules' CPUs. By virtue of assuring a transmission time-slot for each processor module of the system, the intermodule communications bus cannot be tied up by one module. Furthermore, a priority protocol is employed to prevent interference between processor modules attempting to communicate with the same module. Thus, the efficiency of bus use is increased and message transmission between respective processor modules is expedited.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A distributed multi-data processor system wherein a plurality of processor modules, each of which contains a data processor, are distributed along a communication link by way of which the transfer of information from one processor module to another processor module may take place, and wherein the receiving processor module will acknowledge receipt of the information characterized in that each processor module includes:

means for repetitively generating a plurality of time-slots each preassigned to one of said processor modules;

first means, responsive to a request from said data processor for the transmission of a message to another processor module, for recognizing its preassigned time-slot and transmitting a message character during its preassigned time-slot, said message character containing the address of said another processor module and a priority code defining the priority level of the message character;

second means, coupled to said first means, for monitoring said communication link for acknowledgement of receipt of said message character by said another module, and enabling said first means to continuously transmit said message character during each successive occurrence of said preassigned time-slot until said another module acknowledges receipt of said message character and means responsive to receiving the priority code of the message character for altering the priority level of all subsequent message characters which will be accepted by said another module.

2. A distributed multi-data processor system according to claim 1, wherein each processor module further includes third means for monitoring said communication link for message characters containing the address of said each processor module, and causing data included in a message character which contains the address of said each processor module to be stored in that processor module.

3. A distributed multi-data processor system according to claim 2, wherein said third means includes means for latching onto said address-containing message character and for acknowledging receipt of said address-containing message character, over said communication link, during said preassigned time-slot.

4. A distributed multi-data processor system according to claim 2, wherein said priority code is representative of one of high priority and low priority modes, the first character of each message containing a low priority mode indication and each subsequent character of each message containing a high priority mode indication, and wherein said third means includes said altering means for preventing the reception of a message character and storage of data in a message character having a low priority mode indication subsequent to the reception of the first character of a message until that message has been terminated.

5. In a distributed multiprocessor system wherein a plurality of processor modules are distributed along a communication link by way of which the transfer of information from one processor module to another may take place, a method of controlling the transmission and reception of information conveyed by way of said communication link between processor modules, comprising the steps of:

assigning prescribed address codes to each of the processor modules in said system;

generating said address codes in each of the processor modules during respective intervals of time;

for each respective processor module from which the transmission of information to another processor module is to take place, transmitting a message character over said communication link only during an interval of time when the generated address code corresponds to the address code assigned for said each respective processor module, said message character containing the address code of the processor module for whom the message character is intended and a priority code defining the priority level of the message character;

at said each respective processor module, monitoring said communication link for message characters and causing data included in a message character which contains the address of said each respective processor to be stored in that processor module and altering the priority level of all subsequent message characters which will be accepted from the transmitting processor module upon receiving the first message character.

6. A method according to claim 5, further comprising the steps of:

acknowledging receipt of a message character to the transmitting processor module from the message character receiving processor module, and preventing each transmitting processor module from further transmitting said message character during a subsequent occurrence of its assigned time interval in response to said acknowledgement of receipt of said message character by said message character-receiving processor module.

7. A method according to claim 5, wherein said monitoring step includes the step of preventing message characters addressed thereto from transmitting modules, after the first character in a message transmitted from that transmitting module has been received and stored in the processor module, from being received until the message from said that transmitting module has been terminated.

8. A distributed multi-data processor system wherein a plurality of processor modules, each of which contains a data processing unit, are distributed along a communication link by way of which the transfer of information from one processor module to another processor module is effected, characterized in that each processor module includes:

transmission means, coupled to said communication link, for transmitting a message character including a priority mode indicator to another processor module in the system and, receiver means, coupled to said communication link, for monitoring said communication link for messages transmitted thereover, and for accepting only a message addressed to that particular module, means for storing a prescribed code unique to that module and defining the address of the module corresponding to a time interval during which said transmission means may be enabled to transmit a message character to another processor module, means, coupled to said storing means and to said transmission means, for repetitively generating a code sequence containing each of the prescribed codes which define the addresses of the respective processor modules of the system, comparison means, coupled to said code sequence generating means and said storing means, for enabling said transmission means to transmit a message character upon the output of said code sequence generating means corresponding to the code stored in said storing means, and means responsive to the transmission of said priority mode indicator for limiting the transmission of additional message characters to the one processor upon the subsequent generation of the code sequence defining the address of the one processor.

9. A distributed multi-data processor system wherein a plurality of data processor modules, each of which contains a data processing unit, are distributed along a communication link by way of which the transfer of information from one processor module to another processor module is effected, characterized in that each of said processor modules includes a communications interface unit coupled to said communication link and the data processing unit of that module and which carries out the transmission and reception of messages assigned a predetermined priority level between the data processor of that processor module and another processor module, and wherein each of said interface units include;

means for repetitively generating in the same time-frame a plurality of time-slots preassigned to and defining the address of each of said data processor modules, means for recognizing the repetitive occurrence of the time slot preassigned to that processor module;

means for enabling each communication interface unit, in response to a transmission control signal from its associated data processing unit to transmit a message including a priority code component defining the priority level of the message over said communication link during the occurrence of its preassigned time-slot;

means responsive to the generation of the transmission control signal for causing that interface unit of the data processor module to which said message is addressed to receive and store said message in the addressed data processor module;

and means responsive to receiving said priority code component for changing the priority level of the messages to be stored in the data processor module.

10. A distributed multi-data processor system according to claim 9, wherein said enabling means includes respective transmitter means, contained in each communications interface unit, for transmitting, as a component of the transmitted communication, an address code corresponding to the address and preassigned transmission time-slot of the data processor module for which the communication is intended.

11. A distributed multi-data processor system according to claim 10, wherein said enabling means comprises respective storage means, contained in each communications interface unit, for storing an address code corresponding to the address and preassigned transmission time-slot of that data processor module, and respective comparator means, contained in each communications interface unit and coupled to said storage means and to said communications link, for comparing the address code component of a communication transmitted over said communication link with the address code stored in said storing means, and causing data included in the transmitted communication to be stored in the data processor module upon said address code component corresponding to the stored address code.

12. A distributed multi-data processor system according to claim 10, wherein said enabling means comprises, in each communications interface unit, code generator means for repetitively generating a sequence of address codes corresponding to the respective address and preassigned transmission time-slot of each data processor module within said plurality of data processor modules, storage means for storing an address code corresponding to the address and preassigned transmission time-slot of that data processor module, comparison means, coupled to said code generator means and said storage means, for comparing the address codes in the repetitively generated sequence of address codes from said code generator means with the contents of said storage means and generating a transmission enabling signal upon an address code generated by said code generator means corresponding to the contents of said storage means, and means, responsive to the transmission enabling signal generated by said comparison means, for causing said transmitter means to output the communication onto said communication link.

13. A distributed multi-data processor system according to claim 12, wherein said causing means further comprises, in each communications interface unit, comparator means, coupled to said storage means and to said communications link, for comparing the address code component of a communication transmitted over said communication link with the contents of said storage means, and causing data contained in the transmitted communication to be received and stored in that data processor module upon said address code component corresponding to the stored address code.

14. A distributed multi-data processor system according to claim 13, wherein said causing means includes means for storing the priority code component indicating the priority mode of communications which may be accepted by that data processor module, and means, coupled to said comparator means and said priority mode indication storing means, for inhibiting said comparator means from causing data contained in a transmitted communication to be stored in the data processor module unless the priority mode represented by the priority code component of the transmitted communication corresponds to the stored priority mode indication.

15. A distributed multi-data processor system according to claim 13, wherein each interface unit further comprises means, coupled to said comparator means, for transmitting a message receipt acknowledgement signal over said communication link in response to said comparator means causing a communication transmitted from another data processor module to be received and data contained therein stored, to thereby inform said another data processor module that the transmitted communication has been received.

16. A distributed multi-data processor system according to claim 15, wherein said causing means includes means for storing said priority code component indicating the priority mode of communications which may be accepted by that data processor module, and means, coupled to said comparator means and said priority mode indication storing means, for inhibiting said comparator means from causing a transmitted communication to be received and data contained therein stored in the data processor module unless the priority mode represented by the priority code component of the transmitted communication corresponds to the stored priority mode indication.

17. A distributed multi-data processor system according to claim 15, wherein each interface unit further comprises means for selectively coupling an interrupt signal to the data processing unit to which the interface unit is coupled in response to said comparator means causing data contained in a communication transmitted from another data processor module to be stored.

18. A distributed multi-data processor system according to claim 17, wherein each interface unit further comprises means, responsive to the transmission of a communication by that interface unit to a receiving data processor module and responsive to receipt of a message receipt acknowledgement signal from said receiving data processor module, for selectively coupling an interrupt signal to the data processing unit to which said that communication interface unit is coupled.

19. A distributed multi-data processor system according to claim 18, wherein said enabling means comprises means for synchronizing the code generator means in each of the communications interface units of the data processor modules of the system.

20. A distributed multi-data processor system according to claim 19, wherein said communications link comprises an intermodule communications bus connected exclusively to each interface unit, said bus containing address, data, and control lines, and wherein each communication transmitted from one interface unit to another is comprised of a data component coupled over said data lines, said address code component coupled over said address lines, and a control component including said priority code and a signal for synchronizing said code generator means coupled over said control lines.

21. A distributed multi-data processor system, according to claim 20, wherein said control lines include a line over which said message receipt acknowledgement signal is transmitted from a communication receiving interface unit to a communication transmitting interface unit.

22. A distributed multi-data processor system, according to claim 20, wherein each interface unit includes means for transmitting a complete message as a sequence of discrete communications, the priority mode of the first communication of the message being of a low priority and the priority mode of the second and subsequent communications of the message being of high priority, and wherein each interface unit includes means for causing said priority mode indication storing means to store an indication of low priority mode until the first communication of a message is received and data contained therein is stored and for causing said priority mode indication storing means to thereafter store an indication of high priority through the completion of the message.

* * * * *